United States Patent Office 3,401,056
Patented Sept. 10, 1968

3,401,056
FORMATION OF COATINGS ON
GERMANIUM BODIES
John George Wilkes, Hatch End, Middlesex, England, assignor to The General Electric Company Limited, London, England
No Drawing. Filed Sept. 3, 1965, Ser. No. 485,126
5 Claims. (Cl. 117—212)

In British patent specification No. 976,559 we have disclosed that it is possible to form on a germanium body a coating of germanium dioxide having a tetragonal crystal structure, such a coating being usable for certain purposes connected with the technology of semiconductor devices.

In some cases it may be desired to form an aperture in such a coating; this has hitherto presented difficulties, more particularly since the tetragonal form of germanium dioxide is chemically extremely inert. It is an object of the present invention to provide a means whereby these difficulties may be circumvented.

According to the invention there is provided a method of forming on a germanium body a coating of germanium dioxide having a tetragonal crystal structure, in which during the formation of the coating part of the surface of the body is masked by a previously formed layer consisting essentially of at least one of the oxides of silicon, said layer subsequently being removed by treatment with a reagent which does not appreciably attack the germanium dioxide coating.

The coating of germanium dioxide may for example be formed by heating the germanium body above 400° C. while exposed to an oxidising atmosphere containing water vapour, the total pressure of said atmosphere being at least 30 kgs./cm.$^2$.

One method of performing the invention will now be described by way of example.

In this method a germanium body, which is to have a coating of germanium dioxide formed on it, firstly has formed on it a coating of silica having a thickness approximately the same as that of the desired coating of germanium dioxide. The silica coating may suitably be formed by a known method utilising the thermal decomposition of tetra-ethoxy silane—$Si(O.CH_2.CH_3)_4$; for example where a coating of thickness about two microns is required, the germanium body may be maintained for a period of about three hours at a temperature in the range 600–700° C. while there is passed over it a stream of argon containing tetra-ethoxy silane vapour, the latter having been derived by bubbling argon at a rate of about 300 cc./minute through liquid tetra-ethoxy silane maintained at room temperature.

At least one area of the silica coating is then masked with a suitable resist material, and the remainder of the silica coating is removed by treatment with hydrofluoric acid, the, or each, masked area corresponding in position and shape to an aperture which it is desired to form in the final coating of germanium dioxide.

After removal of the resist material, the body is placed in a steel high pressure vessel which has an internal volume of about 100 cc. and which is lined with platinum to prevent contamination of the contents. A small quantity of water is introduced into the vessel, the volume of water being chosen in accordance with the desired thickness of the coating of germanium dioxide and for example having a value of 0.25 cc. where the thickness is to be about two microns; the vessel is then filled with oxygen at a pressure in the range 100–150 kgs./cm.$^2$ and sealed. The sealed vessel is heated in a suitable furnace to a temperature of about 700° C., being maintained at this temperature for about 20 hours and then allowed to cool to room temperature.

The heat treatment in the sealed vessel results in the formation on the germanium body of a coherent adherent coating of germanium dioxide having a tetragonal crystal structure, this coating covering the whole surface of the body except for the area or areas covered by the silica, which remains intact during the heat treatment. The silica is subsequently removed by treatment with hydrofluoric acid, which does not attack the tetragonal form of germanium dioxide, thus forming the desired aperture or apertures in the germanium dioxide coating.

In an alternative method to that described above, the silica coating may be replaced by a coating of silicon monoxide, which may for example be formed by an evaporation technique. In this case the silicon monoxide left on the germanium body will be largely converted to silica during the process of forming the coating of germanium dioxide.

I claim:
1. A method of manufacturing a germanium body having formed on its surface a coherent adherent coating of germanium dioxide having a tetragonal crystal structure, in which coating there is at least one aperture, which method includes the steps of:
    (a) masking part of the surface of the body,
        (i) said part corresponding in position and shape to the position and shape of the desired aperture in the germanium dioxide coating;
        (ii) by forming on said part of the surface a layer consisting essentially of at least one of the oxides of silicon,
    (b) then forming on the remainder of the surface a coating of germanium dioxide having a tetragonal crystal structure, and
    (c) subsequently removing the silicon oxide layer from the masked part of the surface by treatment with a reagent which is inert to the germanium dioxide coating.

2. A method according to claim 1 wherein the coating of germanium dioxide is formed by exposing the germanium body to an oxidising atmosphere containing water vapour, the total pressure of said atmosphere being at least 30 kilograms per square centimeter, and heating the body at a temperature above 400° C. while it is exposed to said atmosphere.

3. A method according to claim 1 wherein the said masking layer consists essentially of silica which has been formed by the thermal decomposition of tetra-ethoxy silane.

4. A method according to claim 1 wherein the said silicon oxide layer is removed by treatment with hydrofluoric acid.

5. A method of manufacturing a germanium body having formed on its surface a coherent adherent coating of germanium dioxide having a tetragonal crystal structure, in which coating there is at least one aperture, which method includes the steps of:
    (a) forming a coating of silica on the whole of the surface of a germanium body,
        (i) by heating the said body at a temperature in the range of 600° C. to 700° C. for three hours,
        (ii) while causing to pass over the body a gaseous mixture of argon and tetra-ethoxy silane vapour,
        (iii) obtained by bubbling argon at a rate of 300 cubic centimeters per minute through liquid tetra-ethoxy silane maintained at room temperature,
    (b) then masking with a resist material at least one area of the silica coating corresponding in position and shape to the position and shape of an aperture which it is desired to form in the final germanium dioxide coating,
    (c) then removing the remainder of the silica coating by treatment with hydrofluoric acid, (d) then removing the said resist material from each masked area of the silica coating,
(e) then placing the germanium body in a steel vessel lined with platinum and introducing into the vessel a volume of water equal to 0.25% of the internal volume of the vessel,
(f) then filling the vessel with oxygen at a pressure in the range of 100 to 150 kgs./cm.$^2$ and sealing the vessel,
(g) then heating the sealed vessel to a temperature of 700° C. and maintaining it at this temperature for 20 hours to form a coating of said germanium dioxide on the unmasked parts of the surface of the germanium body,
(h) then allowing the vessel to cool to room temperature, and
(i) finally removing the residual silica coating from the germanium body by treatment with hydrofluoric acid.

References Cited

UNITED STATES PATENTS

| 3,298,875 | 1/1967 | Schink | 117—201 X |
| 3,340,163 | 9/1967 | Bradshaw et al. | 117—201 X |
| 3,342,619 | 9/1967 | Chu | 117—201 |

FOREIGN PATENTS

| 219,126 | 12/1958 | Australia. |

WILLIAM L. JARVIS, *Primary Examiner.*